C. RALEIGH & W. V. D. KELLEY.
PHOTOGRAPHIC COLOR SCREEN.
APPLICATION FILED NOV. 6, 1915.
1,278,211.
Patented Sept. 10, 1918.
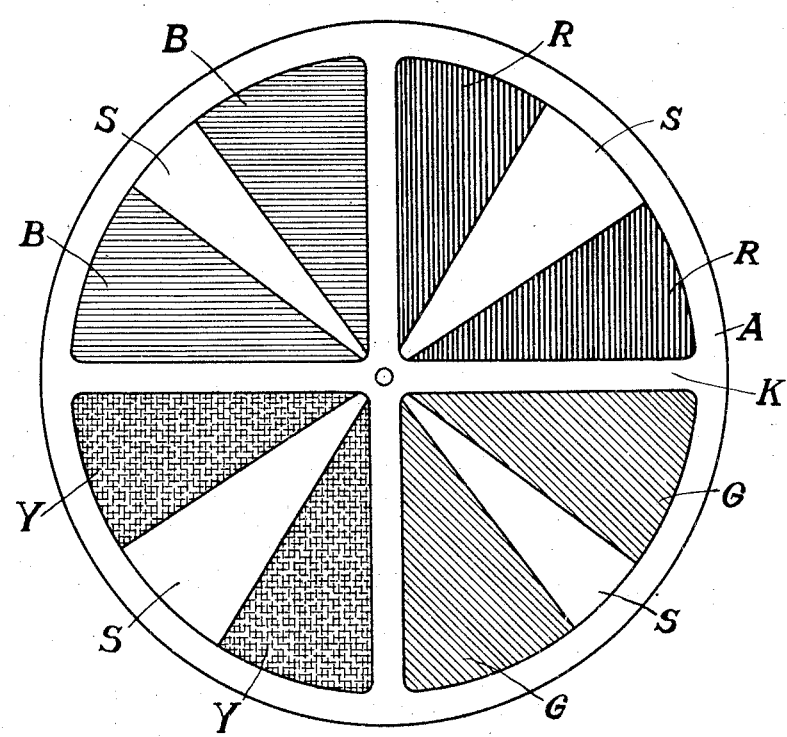

UNITED STATES PATENT OFFICE.

CHARLES RALEIGH AND WILLIAM V. D. KELLEY, OF BROOKLYN, NEW YORK, ASSIGNORS, BY MESNE ASSIGNMENTS, TO PRIZMA INCORPORATED, A CORPORATION OF VIRGINIA.

PHOTOGRAPHIC COLOR-SCREEN.

1,278,211.   Specification of Letters Patent.   Patented Sept. 10, 1918.

Original application filed October 7, 1914, Serial No. 865,431. Divided and this application filed November 6, 1915. Serial No. 59,909.

*To all whom it may concern:*

Be it known that we, CHARLES RALEIGH and WILLIAM V. D. KELLEY, citizens of the United States, residing at Brooklyn, in the county of Kings and State of New York, respectively, have invented certain new and useful Improvements in Photographic Color-Screens, of which the following is a full, clear, and exact description.

This invention relates to photography in colors, and has particular reference to means for obtaining reproductions of motion pictures in natural colors, whereby the pictures will be of delicate color but full of detail, as contrasted with the usual exaggerated color images deficient in photographic detail.

The apparatus at present used for producing photographic pictures in natural colors, records color values in black and white on panchromatic emulsions, the several color values being obtained by filtering the light from the object in taking, and passing the light from the source, in projecting, through color screens. The number of colors in the screens varies with different methods, but commonly ranges from two to four. That is, the screen carrier employed either in taking or projecting may be divided into two, three, four or more selective colored sections, each section transmitting only rays corresponding thereto and excluding others, thus a succession of negatives is produced in taking, which differ from each other in color values.

In the aforementioned two and three color processes it is necessary to photograph and project at a speed of from 32 to 48 per second, which result produces great difference in the individual density of pictures of different color values, and insufficient detail and exposure.

This invention resides particularly in a screen for leveling the varying densities of the different color values in a recurring series of panchromatic pictures, while at the same time retaining a differential color value between them, enabling us to produce colored motion pictures of great detail, of sufficient color, with at least a fifth of the exposure hitherto essential and at a speed practically equal to that of ordinary black and white.

Our invention is adapted to two, three, four, or more color processes. That is, processes in which a corresponding number of different color filters are used for successive pictures. We take a picture through a selective color filter according to the common practice, but in addition we expose each image as made to non-selective white light, or light substantially white whether isochromatic or not, by means of a slot or opening which passes such light. By this we mean a light which will record non-selective values, whether exactly isochromatic or not, on the sensitive emulsion, as distinguished from the predetermined selective color values recorded by colored light. These relatively non-selective values can be produced by a wide variety of lights modified or not by a special filter according to the result desired, or to suit the actinic characteristics of the sensitive emulsion used. For example, some emulsions are more sensitive to certain rays in white light than to others, but we still consider such light as white even after such undesirable rays have been partly or wholly filtered out, because non-selective values will still be recorded by such light. Also, some lights contain a preponderating constituent which, when reduced or eliminated leaves a light which will record non-selective values, and which we consider substantially white as herein defined. In the preferred form, this opening is in the center of each screen, but it may be placed either at the beginning, at the end, or at any other part without altering the invention.

By this addition of white light for each color screen, or for some of them only, the negatives not only record values corresponding to that color, but in addition are intensified and leveled up throughout by the white light. The degree of intensification for any image will depend upon the proportion of the white light opening to the entire screen opening. With our improved apparatus, instead of obtaining only an open spot on the red negative image of a red ball and a black spot on the green negative image, with a two color process, for example, we get an exposure or record of the red ball on both the images, but unequal in intensity. These successive images may appear almost alike to the eye, but there will be a difference, due to the color values, in both the negative and in the positive made therefrom. Correction for excessive blue violet rays in the white light can be made by partially or wholly filling the open space in the screens with a yellow filter. Any other preponderance of light can be similarly corrected by properly coloring the screen opening, either in taking or in projecting. This will be useful in case the emulsion is unduly sensitive to certain rays, or where artificial light is used in taking or projecting, or both. By means of this correction, the light effect on the emulsion can be made isochromatic or as much so as desired, for any or all colors.

In the accompanying drawing, A represents a rotary disk having four color screens, B for blue, R for red, G for green, Y for yellow, separated by spaces K. It will be understood that this screen will be applied to an ordinary camera in taking or projecting, and that while the image is being exposed the disk revolves one screen section, being moved from one color to begin the next while the film is being changed from one section to the next. Each of these screens is provided with a slot or opening S which passes the substantially white light as above described, the slots being proportioned so as to permit the desired volume of white light for each color. The openings are ordinarily uneven, as shown, the wider openings being associated with the less actinic colors. Uneven colors, with equal openings would produce the same result. Thus each screen section is composed of a different color, and a common color (white, etc.)

As the screen shown herein passes the lens, the exposure is first made through the colored part, then through the opening which adds the exposure of all the colors in the white light, then a further exposure is made through the remainder of the color screen. If the slot or opening is at one end of the screen, the sequence differs correspondingly. Where we speak of white light, we mean a light which records non-selective values and usually containing all the screen colors, whether corrected to compensate for any preponderance, or not. This evens up or intensifies the entire exposure, but still leaving a preponderance of color value in the image corresponding to the color of the screen through which this particular image is made. The pictures produced by this screen have an effect of solidity and relief more nearly approaching a stereoscopic effect, are more uniform in density, depth and detail, and can be made at a much lower speed and in a much less intense light than with prior known screens. The increased effect of solidity and relief is due to the fact that each image is a composite containing values representing both the color screen exposure and the non-selective values for white, or substantially white light. Each composite image has a greater detail and perspective than either a black and white record or a simple selective color value record alone can have. For example, in the ordinary two color process employing red and green-blue screens, a red ball only records or impresses on the red negative film area, and is represented on the green negative film area only by a white circle having no rotundity. In the projection of positives made from two such negatives, it will be seen that only the red image helps to give the impression of rotundity to the ball. The images of our invention have on the red negatives not only the same red values as before, but also the non-selective value, while the green negative areas show a non-color selective image of the same object which possesses to a certain degree, the necessary shading required to produce the effect of rotundity. Of course, if there is any green in the object this is also recorded on the green negative in addition to the non-selective values. Thus every image produces an effect of relief and solidity approaching a stereoscopic effect, and which differs both from a plain black and white and from a plain color image, and this effect is especially pronounced where the pictures are exhibited in recurring series.

It will be understood that the invention may be carried out in various ways, and by screens other than the preferred form illustrated herein, and we do not wish to be understood as restricting ourselves to any particular structure, other than as required by the appended claims.

This application is a division of application Serial Number 865,431, filed October 7, 1914, patented Feb. 27, 1917, No. 1,217,425.

Having thus described our invention, what we declare as new and desire to secure by Letters Patent, is:—

1. In a movable color filter taking screen, a color selective section for making a color value record having a portion non-selective to color for intensifying the picture area exposed therewith.

2. A movable screen for making color value records composed of complementary color selective sections, each section having an intensifying portion for the picture area exposed therewith.

3. In a movable color filter taking screen, a divided color selective section for making a color value record separated by a clear section for intensifying the picture area exposed therewith.

4. A movable screen for producing recurring multi-color photographic records comprising color sections, and a clear section associated with at least one of said color sections and proportioned according to its associated color.

5. A movable screen for producing a photographic color record comprising a color section, and a clear section varying in area inversely with the actinic power of the color.

6. A movable screen for producing multi-color photographic records comprising a section for each color, each section having an associated clear portion and the respective clear portions having different areas.

7. A screen for producing a photographic record of color values, said screen comprising one or more color sections with at least one of said color sections having as part thereof a clear section, the same being so constructed that the light passing through such color section and such clear section will operate upon the same emulsion area while said emulsion area is at rest and during the same exposure thereof.

8. A screen for producing a photographic record of color values, said screen comprising one or more color sections, at least one of which said color sections has a portion thereof substantially clear but compensated for preponderating action of light on the emulsion.

9. A transparent filter screen selective to a predetermined color, and having a portion of its effective area non-selective except to a preponderating constituent of the rays passing through said color selective portion.

10. A transparent filter screen having a plurality of sections each selective to a predetermined different color, and having a portion of the effective area in each section non-selectively colored relatively to said predetermined colors whereby to compensate for a preponderating constituent in the light transmitted by each section.

11. A screen for producing photographic records of color values, said screen having four sections of complementary colors, each section being of a single color, with at least one of said sections having as part thereof a clear portion, the screen being so constructed that the light passing through such color section and the associated clear portion will operate upon the same sensitive emulsion while said emulsion area is at rest and during one exposure, said four sections acting successively to produce natural color rendering.

12. A screen for making color value records having four complementary color selective sections arranged so that a section selective to the red side of the spectrum alternates with one selective to the blue side of the spectrum, each of said sections having a coextending clear portion for intensifying the record.

In testimony whereof we affix our signatures in presence of two witnesses.

CHARLES RALEIGH.
WILLIAM V. D. KELLEY.

Witnesses:
AUGUST T. WILHELM,
CELIA TRAURIG.